(12) United States Patent
Yamada

(10) Patent No.: US 11,081,131 B2
(45) Date of Patent: Aug. 3, 2021

(54) FLEXURE OF DISK DRIVE SUSPENSION

(71) Applicant: NHK SPRING CO., LTD., Yokohama (JP)

(72) Inventor: Yukie Yamada, Yokohama (JP)

(73) Assignee: NHK SPRING CO., LTD., Tokyo (JP)

( * ) Notice: Subject to any disclaimer, the term of this patent is extended or adjusted under 35 U.S.C. 154(b) by 0 days.

(21) Appl. No.: 17/101,034

(22) Filed: Nov. 23, 2020

(65) Prior Publication Data

US 2021/0193177 A1   Jun. 24, 2021

(30) Foreign Application Priority Data

Dec. 19, 2019   (JP) .............................. JP2019-229135

(51) Int. Cl.
*G11B 5/48*   (2006.01)

(52) U.S. Cl.
CPC .................................. *G11B 5/484* (2013.01)

(58) Field of Classification Search
None
See application file for complete search history.

(56) References Cited

U.S. PATENT DOCUMENTS

| | | | |
|---|---|---|---|
| 6,396,665 B1 | 5/2002 | Asano | |
| 9,396,747 B2 | 7/2016 | Kawao | |
| 9,449,624 B2 * | 9/2016 | Arai | ...................... G11B 5/4846 |
| 9,564,155 B2 * | 2/2017 | Arai | ........................ G11B 5/486 |
| 9,576,600 B2 * | 2/2017 | Arai | ......................... G11B 5/48 |
| 9,576,601 B2 * | 2/2017 | Arai | ...................... G11B 5/4833 |
| 9,679,592 B2 | 6/2017 | Kawao | |

FOREIGN PATENT DOCUMENTS

JP       H11191210 A       7/1999

* cited by examiner

*Primary Examiner* — William J Klimowicz
(74) *Attorney, Agent, or Firm* — Holtz, Holtz & Volek PC

(57) ABSTRACT

The flexure tail includes a tail body, a first bent portion extending in a width direction of the tail body, a second bent portion extending in a length direction of a flexure, a tail pad portion, a conductor bent portion where a direction of a conductor changes, an extension portion, and a test conducting portion. The test conducting portion includes a conductor connecting portion conductive to a conductor, a jumper conductor, and a test pad arranged in the extension portion. The jumper conductor has a first end portion connected to the conductor connecting portion, and a second end portion connected to the test pad.

7 Claims, 15 Drawing Sheets

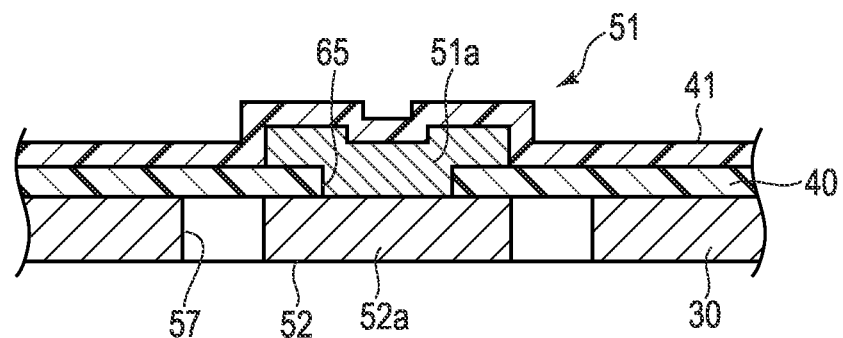
F I G. 6
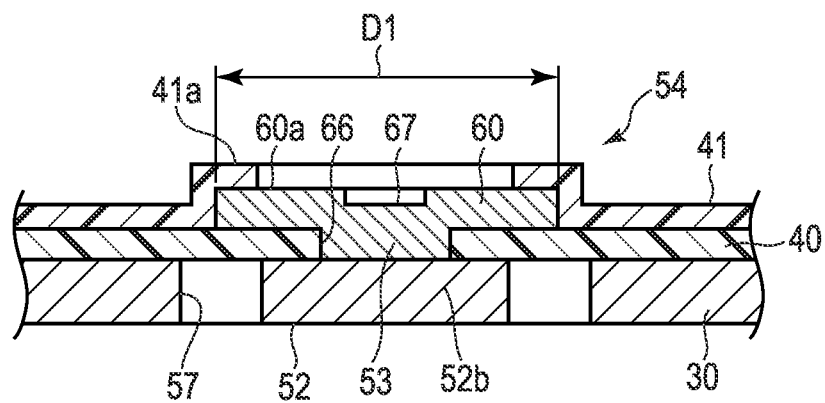
F I G. 7
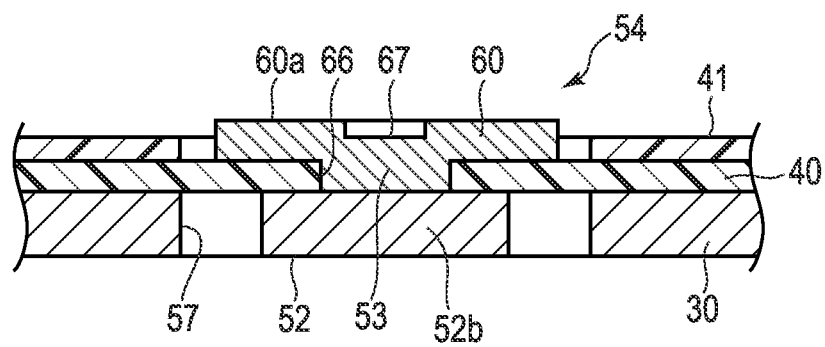
F I G. 8

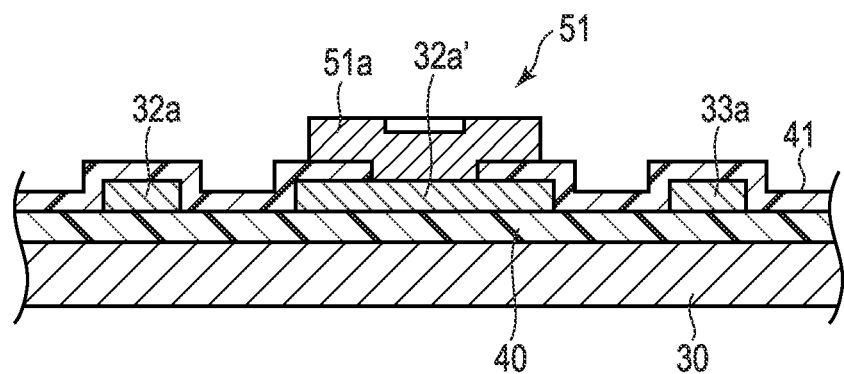
F I G. 16
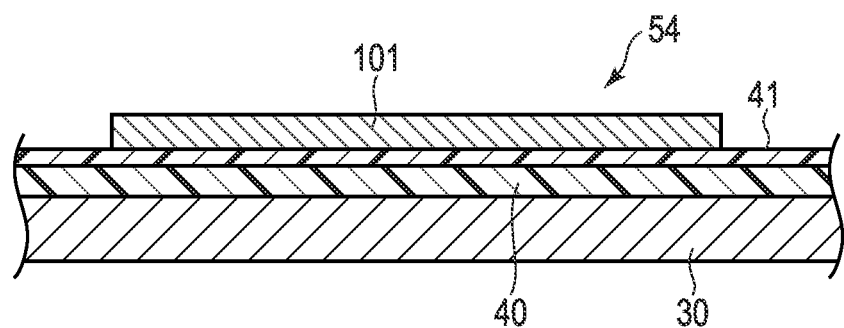
F I G. 17

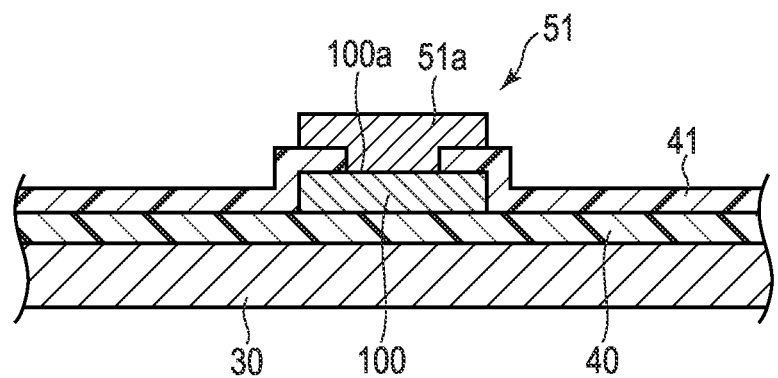
F I G. 19
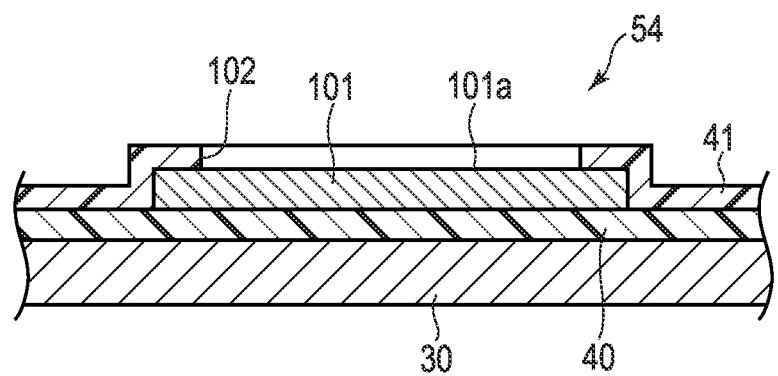
F I G. 20

FLEXURE OF DISK DRIVE SUSPENSION

CROSS-REFERENCE TO RELATED APPLICATIONS

This application is based upon and claims the benefit of priority from prior Japanese Patent Application No. 2019-229135, filed Dec. 19, 2019, the entire contents of which are incorporated herein by reference.

BACKGROUND OF THE INVENTION

1. Field of the Invention

The present invention relates to a flexure of a disk drive suspension, particularly, a flexure having a test pad.

2. Description of the Related Art

A disk drive is used for an information processing device such as a personal computer. The disk drive includes a magnetic disk rotating about a spindle, a carriage turning about a pivot, and the like. A disk drive suspension is provided in an arm of the carriage. The disk drive suspension includes a base plate, a load beam, a flexure, and the like. A slider is provided in a gimbal portion formed close to a distal end of the flexure. An element for making accesses such as reading of data recorded on the disk and writing of data is provided in the slider.

The flexure includes a metal base, a base insulating layer formed on the metal base, a plurality of conductors formed on the base insulating layer, and the like. The metal base is formed of a thin stainless steel plate. The base insulating layer is formed of an electrically insulating material such as polyimide. The conductors are formed of copper. A part of the conductors are connected to elements provided in the slider and electronic components provided in the flexure.

An example of a conventional suspension is described in U.S. Pat. No. 9,679,592 B (Patent Literature 1). A flexure of this suspension has a flexure tail extending in a length direction. A tail pad portion is formed in an end portion of the flexure tail. An electrode pad (referred to as a tail electrode in this specification) for connecting to an electronic circuit such as an amplifier is arranged in the tail pad portion.

In an electrode pad (tail electrode) described in JP H11-191210 A (Patent Literature 2), a hole is opened. In a flexure described in U.S. Pat. No. 9,396,747 B (Patent Literature 3), an electrode pad is arranged in a side portion of a wiring portion. However, when the electrode pad is arranged in the side portion of the wiring portion, the width of the wiring portion is increased, and therefore the width of the flexure tail is increased.

In order to test the characteristics of an electric circuit provided in the flexure, in some cases, a measuring device having a probe is used. For example, one probe of a pair of probes is brought into contact with the tail electrode, and the other probe is brought into contact with the metal base of the flexure. Accordingly, the characteristics of the circuit is tested.

During the testing of the circuit, it is necessary to reliably bring a measuring probe into contact with a specific tail electrode. However, when a hole is opened in the tail electrode as described in Patent Literature 2, in some cases, the contact of the probe and the tail electrode is unreliable. In the small area of the tail part portion, the small tail electrodes are arranged at small intervals. Therefore, it is difficult to bring the probe into contact with the specific tail electrode. In some cases, the probe may be brought into contact with another tail electrode.

A countermeasure that is conceived is arranging the tail electrode to be made conductive to the circuit to be tested outside the wiring portion of the flexure tail. The probe is brought into contact with this tail electrode. However, when the tail electrode is arranged outside the wiring portion, the width of the wiring portion is substantially increased. Therefore, the width of the flexure tail is increased. In addition, when a hole is opened in the electrode pad of the flexure tail, it is difficult to reliably bring the probe into contact with the electrode pad.

BRIEF SUMMARY OF THE INVENTION

An object of the present invention is to provide a flexure of a disk drive suspension which can test the flexure using a test pad arranged in a flexure tail and where the test pad is arranged at a preferable position of the flexure tail.

A flexure according to one embodiment includes a metal base formed of a plate of metal such as stainless steel, a base insulating layer formed on the metal base, and conductors arranged on the base insulating layer. The flexure has a flexure tail. The flexure tail includes a tail body, a first bent portion, a second bent portion, a tail pad portion, a tail electrode, a conductor bent portion, an extension portion, a conductor connecting portion, a jumper conductor, and a test terminal portion including a test pad. The tail body extends in a length direction of the flexure. The first bent portion extends in a width direction of the tail body from the tail body. The second bent portion extends in the length direction of the flexure from the first bent portion. The tail pad portion continues from the second bent portion. The tail electrode is arranged in the tail pad portion and is conductive to the conductor. An elbow portion is formed in a part of the flexure tail by the first bent portion and the second bent portion.

In the conductor bent portion, a direction of the conductors changes along the first bent portion and the second bent portion. The extension portion extends in an opposite direction to the tail pad portion from the second bent portion. This extension portion is located outside the conductor bent portion. The conductor connecting portion is provided in the tail pad portion, the elbow portion or the like. This conductor connecting portion is conductive to the conductor. The jumper conductor has a first end portion and a second end portion. The first end portion is conductive to the conductor connecting portion. The test terminal portion including the test pad is arranged in the extension portion. This test terminal portion is conductive to the second end portion of the jumper conductor.

According to this embodiment, testing can be carried out using the test pad conductive to the tail electrode. Therefore, even if a hole is opened in the tail electrode, testing by a probe can be carried out without problem. In addition, while the test pad is provided, an increase in width of the wiring portion is suppressed. Therefore, an increase in width of the flexure tail can be suppressed. In some cases, testing can be carried out using the tail electrode.

An example of the jumper conductor is formed of common stainless steel to the metal base. This jumper conductor is formed in an island shape in a same plane as the metal base. A gap for electrically insulating the jumper conductor and the metal base is formed over an entire circumference of the jumper conductor. An example of the conductor connecting portion is arranged in a space between a first conductor group and a second conductor group. The first conductor group and the second conductor group extend in a length direction of the tail pad portion. The extension portion is provided preferably between a first line segment and a second line segment. The first line segment is a virtual line segment where one side surface of the tail pad portion is extended in a length direction of the tail pad portion. The second line segment is a virtual line segment where another side surface of the tail pad portion is extended in the length direction.

The test terminal portion may include a pad connecting portion, the test pad, and a connecting conductor. The pad connecting portion is connected to the second end portion of the jumper conductor. The test pad is located at a position away from the pad connecting portion. The connecting conductor connects the pad connecting portion and the test pad.

One example of a type of flexure having a double-layer wiring includes the base insulating layer formed on the metal base, the conductors formed on the base insulating layer, the cover insulating layer covering the conductors, the jumper conductor formed on the cover insulating layer, and the test pad formed on the cover insulating layer. Another example of the type of flexure having the double-layer wiring includes the base insulating layer formed on the metal base, the jumper conductor formed on the base insulating layer, the test pad formed on the base insulating layer, the cover insulating layer covering the jumper conductor, and the conductors formed on the cover insulating layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a cross-sectional view of a conductor connecting portion of the flexure shown in FIG. 4.

FIG. 7 is a cross-sectional view of a test terminal portion of the flexure shown in FIG. 4.

FIG. 8 is a cross-sectional view of a test terminal portion of a flexure according to the second embodiment.

FIG. 16 is a cross-sectional view of a conductor connecting portion of the flexure shown in FIG. 15.

FIG. 17 is a cross-sectional view of a test terminal portion of the flexure shown in FIG. 15.

FIG. 19 is a cross-sectional view of a conductor connecting portion of the flexure shown in FIG. 18.

FIG. 20 is a cross-sectional view of a test terminal portion of the flexure shown in FIG. 18.

DETAILED DESCRIPTION OF THE INVENTION

First Embodiment

A flexure of a disk drive suspension according to the first embodiment will be described hereinafter with reference to FIGS. 1 to 7.

Figure 1:
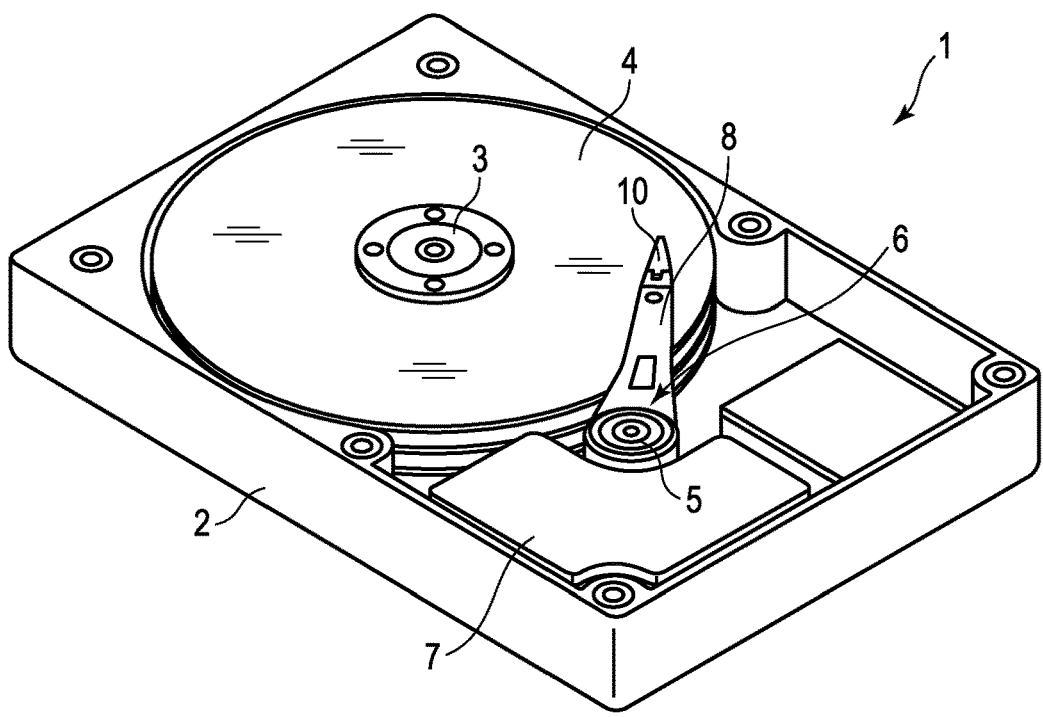
FIG. 1 is a perspective view showing an example of a disk drive.

A disk drive (hard disk drive) 1 shown in FIG. 1 includes a case 2, a disk (magnetic disk) 4 which rotates about a spindle 3, a carriage 6 which turns about a pivot 5, and a positioning motor 7 which turns the carriage 6. The case 2 is sealed by a lid which is not shown in the drawing.

Figure 2:
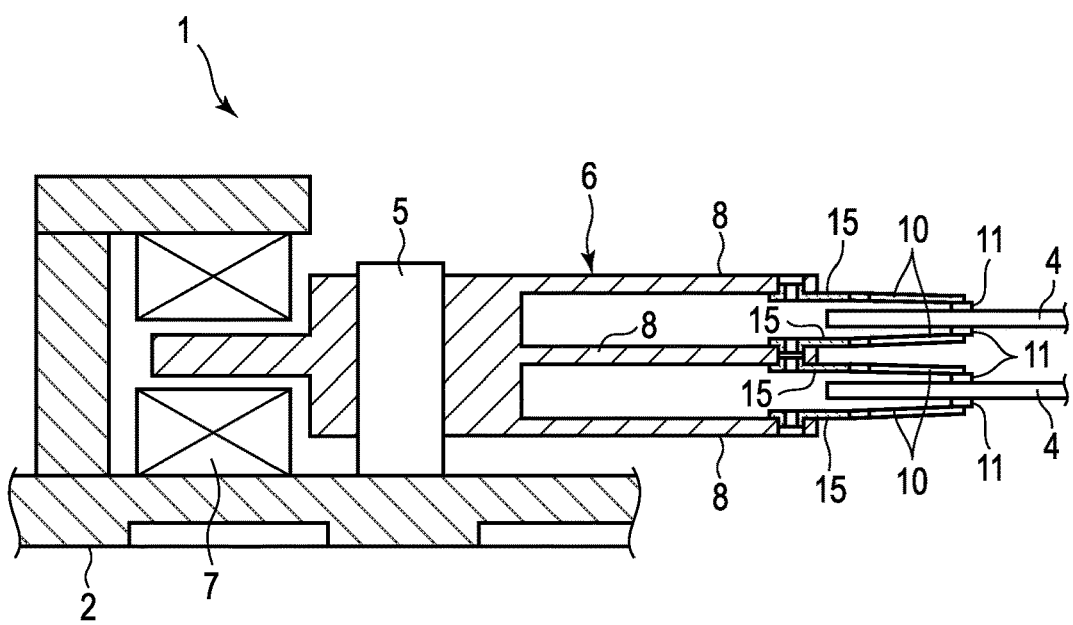
FIG. 2 is a cross-sectional view of a part of the disk drive shown in FIG. 1.

FIG. 2 is a cross-sectional view schematically showing a part of the disk drive 1. An arm 8 is provided in the carriage 6. A suspension 10 is attached to a distal end portion of the arm 8. A slider 11 constituting a magnetic head is provided close to a distal end portion of the suspension 10.

When the disk 4 rotates, an air bearing is formed between the disk 4 and the slider 11. When the carriage 6 is turned by the positioning motor 7, the slider 11 is moved to a desired track of the disk 4. The slider 11 is provided with an element for recording data on the disk 4 and an element for reading data recorded on the disk 4.

Figure 3:
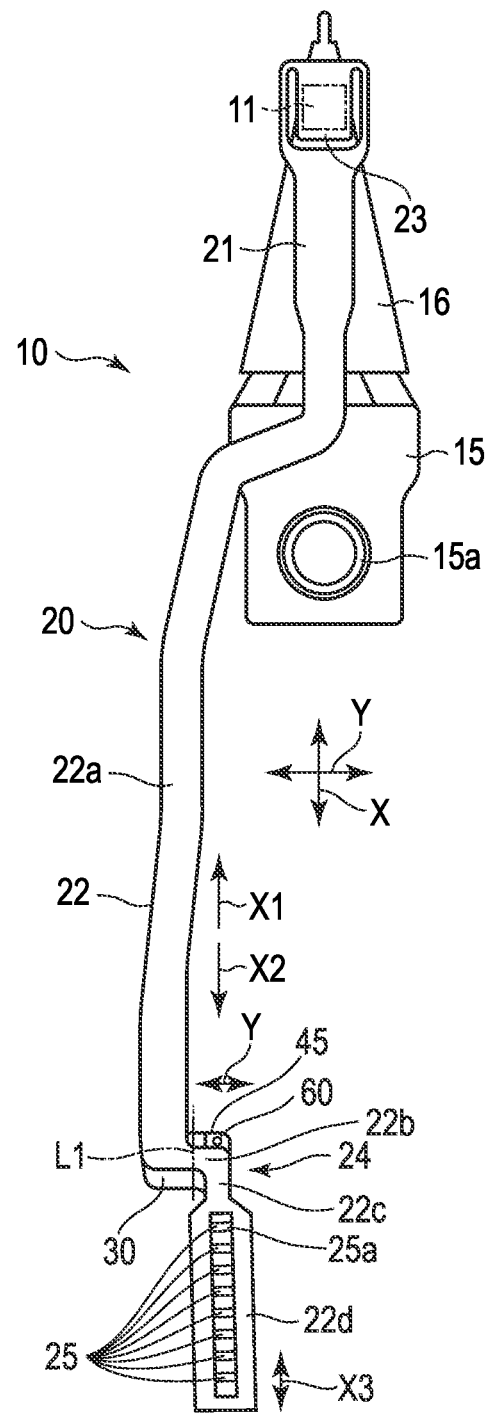
FIG. 3 is a plan view of a disk drive suspension including a flexure according to the first embodiment.

FIG. 3 shows an example of a head gimbal assembly including the suspension 10 and the slider 11. The suspension 10 includes a base plate 15, a load beam 16, a flexure 20, and the like. A boss portion 15a of the base plate 15 is fixed to the arm 8 of the carriage (shown in FIGS. 1 and 2).

The load beam 16 is formed of a stainless steel plate. The thickness of the load beam 16 is, for example, 30 to 80 μm. A double-headed arrow X shown in FIG. 3 indicates a length direction of the suspension 10, that is, a length direction of the flexure 20. An arrow X1 indicates a front side of the flexure 20, and an arrow X2 indicates a rear side of the flexure 20. A double-headed arrow Y shown in FIG. 3 indicates a width direction of a flexure tail 22.

The flexure 20 includes a portion 21 on a distal end side and a flexure tail 22. The distal end side portion 21 overlaps the load beam 16. The flexure tail 22 extends from the distal end side portion 21 toward a rear side of the base plate 15. A tongue 23 which functions as a swingable gimbal portion is formed in the distal end side portion 21 of the flexure 20. The slider 11 is mounted on the tongue 23.

The flexure tail 22 includes a tail body 22a, a first bent portion 22b, a second bent portion 22c, and a tail pad portion 22d. The tail body 22a extends in the length direction X of the flexure 20 from close to a side portion of the base plate 15. The first bent portion 22b extends in the width direction Y of the flexure tail 22 (shown in FIG. 3) from a rear end of the tail body 22a. The second bent portion 22c extends in the length direction X of the flexure tail 22 from an end of the first bent portion 22b. An elbow portion 24 where a direction changes in an L shape is formed by the first bent portion 22b and the second bent portion 22c. The elbow portion 24 is formed between the tail body 22a and the tail pad portion 22d.

The tail pad portion 22d continues from the second bent portion 22c toward a rear side of the flexure 22 (indicated by the arrow X2 in FIG. 3). A plurality of tail electrodes (electrode pads) 25 which are connected to electronic circuits such as an amplifier are arranged in the tail pad portion 22d. The first bent portion 22b has a bend line L1 (shown by a dashed-dotted line in FIGS. 3 to 5). In a bending process, the bend line L1 is bent at a substantially right angle in a thickness direction of a metal base 30.

Figure 4:
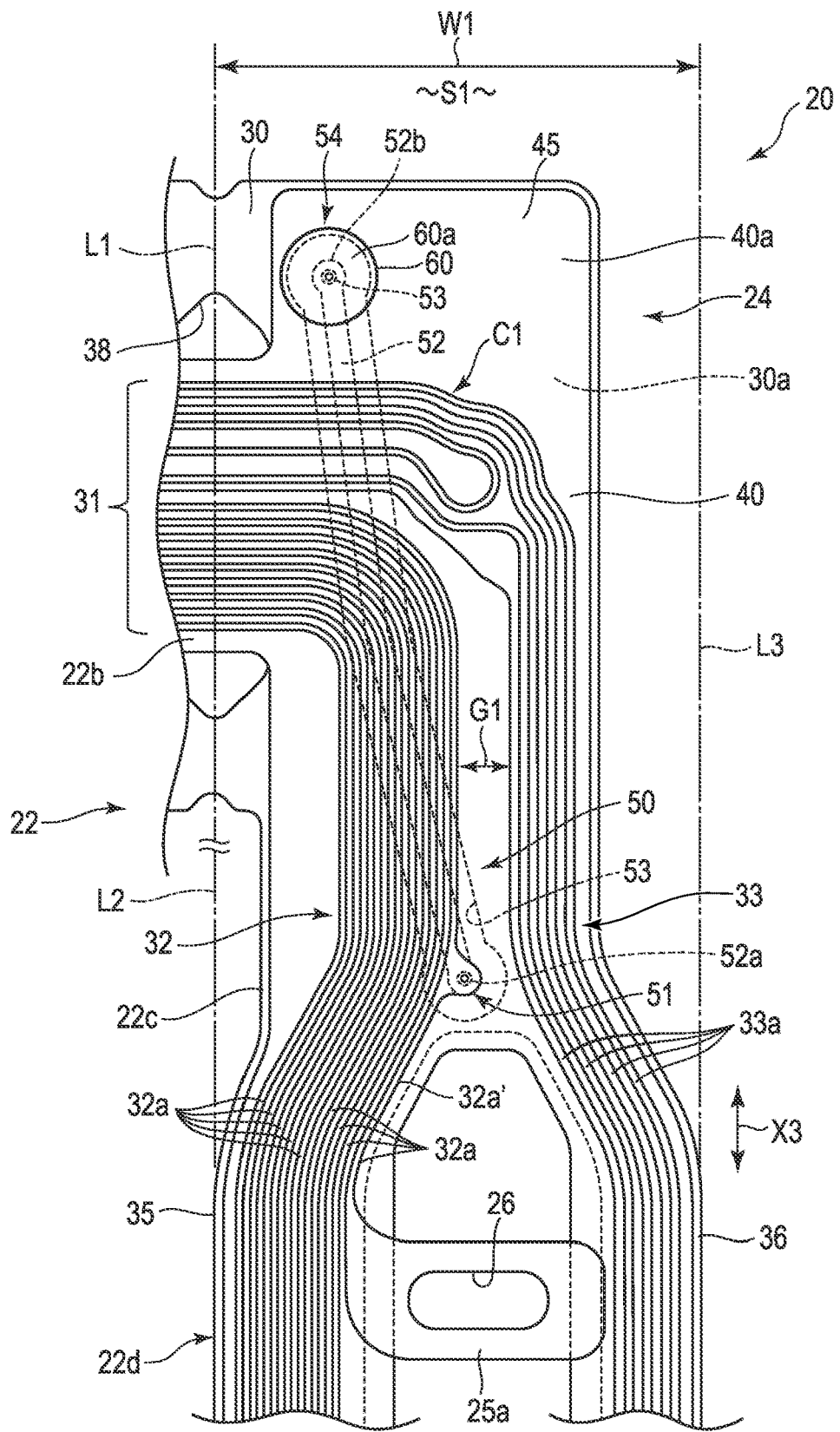
FIG. 4 is a plan view of a part of the flexure shown in FIG. 3.

FIG. 4 is a plan view showing a part of the flexure 20. The flexure 20 includes a metal base 30, and a wiring portion 31 arranged along the metal base 30. In the distal end side portion 21 (shown in FIG. 3) of the flexure 20, the metal base 30 is fixed to the load beam 16 by a fixing portion such as laser welding.

FIG. 4 shows a part (elbow portion 24) in the length direction of the flexure tail 22. The wiring portion 31 includes a first conductor group 32 having a plurality of conductors 32a, and a second conductor group 33 having a plurality of conductors 33a. The first conductor group 32 and the second conductor group 33 are each arranged along the length direction of the flexure tail 22.

The flexure tail 22 includes the elbow portion 24 bent in an L shape. As shown in FIG. 4, in the elbow portion 24, a part in a length direction of the wiring portion 31 is bent along the first bent portion 22b and the second bent portion 22c. Therefore, a conductor bent portion C1 is formed between the first bent portion 22b and the second bent portion 22c. In the conductor bent portion C1, the directions of the conductor groups 32 and 33 change in an L shape.

A part in a length direction of the first conductor group 32 is arranged along one side surface 35 of the tail pad portion 22d. A part in a length direction of the second conductor group 33 is arranged along another side surface 36 of the tail pad portion 22d. The first conductor group 32 and the second conductor group 33 are spaced apart from each other with a gap G1 (shown in FIG. 4). A conductor 32a' of the conductors 32a of the first conductor group 32 which is conductive to a circuit to be tested is connected to a tail electrode 25a which is closest to the conductor bent portion C1. A hole 26 may be formed in the tail electrode 25a.

Figure 5:
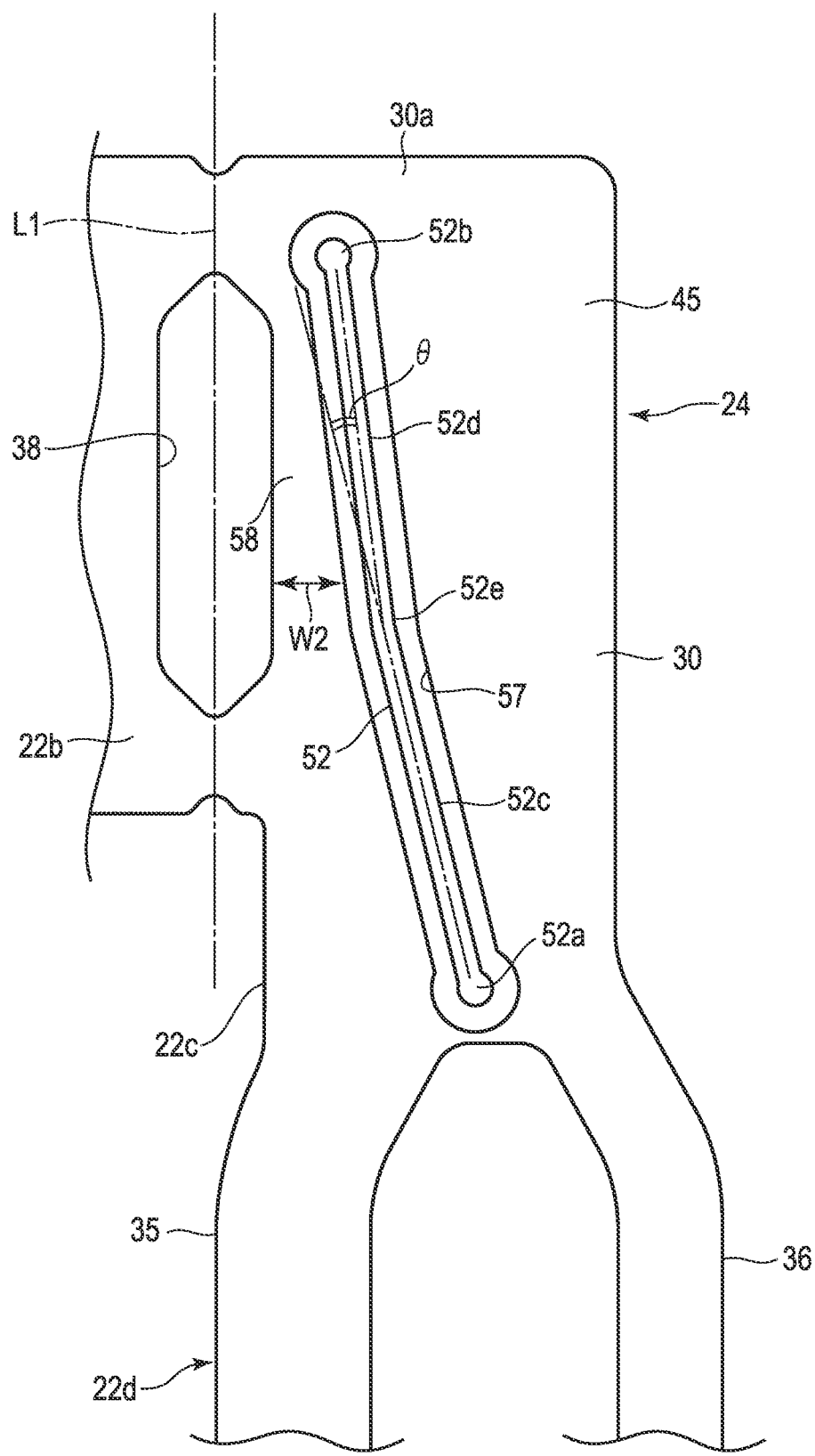
FIG. 5 is a plan view showing a part of a metal base of the flexure shown in FIG. 4.

FIG. 5 shows a part of the metal base 30. The metal base 30 is formed of a stainless steel plate.

The thickness of the metal base 30 is less than the thickness of the load beam 16 and is, for example, 15 to 20 µm. The metal base 30 is bent at a substantially right angle in the thickness direction in the bend line L1 of the first bent portion 22b. Therefore, in order to reduce the bending stiffness of the bend line L1, an opening 38 is formed in the first bent portion 22b.

The wiring portion 31 includes a base insulating layer 40 (shown in FIGS. 4, 6 and 7), the conductors 32a and 33a, and a cover insulating layer 41 (FIGS. 6 and 7). The base insulating layer 40 is formed on the metal base 30. The conductors 32a and 33a are formed on the base insulating layer 40. The cover insulating layer 41 covers the conductors 32a and 33a. In FIG. 4, in order to make the conductors 32a and 33a easy to understand, the cover insulating layer 41 is omitted.

The conductors 32a and 33a are formed of metal having high conductivity such as plated copper. The thicknesses of the conductors 32a and 33a are, for example, 5 µm. A part of the conductors 32a of the first conductor group 32 are used for reading. The conductors 32a are conductive to read terminals formed in the tongue 23. A part of the conductors 33a of the second conductor group 33 are used for writing. The conductors 33a are conductive to write terminals formed in the tongue 23.

The base insulating layer 40 and the cover insulating layer 41 (shown in FIGS. 6 and 7) are formed of electrically insulating resin such as polyimide. The thickness of the base insulating layer 40 is, for example, 10 µm. The thickness of the cover insulating layer 41 is less than the thickness of the base insulating layer 40 and is, for example, 4 µm.

An extension portion 45 is formed in a part in the length direction of the flexure tail 22. The extension portion 45 is formed in the elbow portion 24 including the first bent portion 22b and the second bent portion 22c. Then, the extension portion 45 extends in an opposite direction to the tail pad portion 22d (toward the outside of the conductor bent portion C1) from the second bent portion 22c. That is, the extension portion 45 extends from the second bent portion 22c toward a front side of the flexure tail 22 (in the direction indicated by the arrow X1 in FIG. 3). The extension portion 45 is a part of the flexure tail 22 and includes a part 30a of the metal base 30 and a part 40a of the base insulating layer 40.

As shown in FIG. 4, a virtual line segment where one side surface 35 of the tail pad portion 22d is extended in a direction X3 of the tail pad portion 22d is assumed to be a first line segment L2. In addition, a virtual line segment where the other side surface 36 of the tail pad portion 22d is extended in the direction X3 is assumed to be a second line segment L3. In a region S1 located between the line segments L2 and L3 and having a width W1, the extension portion 45 is formed outside the conductor bent portion C1. Therefore, in the flexure tail 22 of the present embodiment, while the extension portion 45 is provided, the width of the second bent portion 22c is prevented from being greater than that of a conventional product.

The conductor bent portion C1 is arranged along the first bent portion 22b and the second bent portion 22c of the flexure tail 22. Therefore, the directions of the conductor groups 32 and 33 change at close to 90° between the first bent portion 22b and the second bent portion 22c.

A test conducting portion 50 is provided in a part of the flexure tail 22 (portion including the elbow portion 24 and the extension portion 45). The test conducting portion 50 is used for testing the electrical characteristics of a specific circuit of various electric circuits provided in the suspension 10. For example, the test conducting portion 50 is used for accurately understanding the electrostatic capacitance, dissipation factor (tangent delta) or the like of a specific circuit.

As shown in FIG. 4, the test conducting portion 50 includes a conductor connecting portion 51, a jumper conductor 52, a pad connecting portion 53 and a test terminal portion 54. The test conducting portion 50 is provided in the region S1 inside the line segments L2 and L3 where both side surfaces 35 and 36 of the tail pad portion 22d are extended in the length direction.

The conductor connecting portion 51 is formed in the middle in the length direction of the conductor 32a'.

The conductor connecting portion 51 is arranged in the space G1 between the first conductor group 32 and the second conductor group 33 in the tail pad portion 22d. Therefore, while the test conducting portion 50 is provided in the flexure tail 22, the width of the second bent portion 22c and the width of the tail pad portion 22d are prevented from being greater than those of a conventional product. Note that the conductor connecting portion 51 may be provided in the elbow portion 24.

The jumper conductor 52 is shown in FIG. 5. The jumper conductor 52 of the present embodiment is formed in an island shape in the same plane as the metal base 30 by removing a part of the metal base 30 by etching. That is, in an etching process, the jumper conductor 52 having a long and thin island shape is formed by removing the periphery of a part of the metal base 30 (portion to be the jumper conductor 52). A gap 57 for electrically insulating the jumper conductor 52 and the metal base 30 is formed over the entire circumference of the jumper conductor 52. An example of the gap 57 is an air gap using air as an insulating material. An insulating material such as polyimide may be provided inside the gap 57.

As shown in FIG. 5, the jumper conductor 52 has one end portion in a length direction (first end portion 52a) and another end portion (second end portion 52b). A first portion 52c and a second portion 52d are formed between the first end portion 52a and the second end portion 52b. The first portion 52c and the second portion 52d are angled at an angle θ (shown in FIG. 5) in a middle portion 52e in the length direction of the jumper conductor 52.

The first end portion 52a of the jumper conductor 52 is arranged at a position corresponding to the conductor connecting portion 51 of the tail pad portion 22d. The second end portion 52b is arranged in the extension portion 45. Therefore, the jumper conductor 52 extends in the length direction of the tail pad portion 22d from the tail pad portion 22d toward the extension portion 45. The gap 57 also extends in the length direction of the tail pad portion 22d from the tail pad portion 22d toward the extension portion 45. In addition, the jumper conductor 52 and the gap 57 are provided in the region S1 inside the line segments L2 and L3. The line segments L2 and L3 are virtual lines where both side surfaces 35 and 36 of the tail pad portion 22d are extended in the length direction. The first bent portion 22b is provided in a part of the flexure tail 22. In a bending process, the first bent portion 22b is bent at a substantially right angle in a plate thickness direction in the bend line L1 passing through the opening 38. The jumper conductor 52 and the gap 57 are formed close to the bend line L1. Therefore, a narrow portion 58 having a width W2 is present between the opening 38 and the gap 57. If the width W2 of the narrow portion 58 is too small, during the bending of the bend line L1, deformation exceeding an allowable limit may occur close to the narrow portion 58.

Therefore, the jumper conductor 52 of the present embodiment is formed in an angled shape so that the second portion 52d along the opening 38 is prevented from being too close to the opening 38. That is, the second portion 52d is angled at the angle θ (shown in FIG. 5) with respect to the first portion 52c. Accordingly, the bending stiffness of the narrow portion 58 is prevented from being too small.

The first end portion 52a of the jumper conductor 52 is connected to the conductor 32a' via the conductor connecting portion 51 (shown in FIGS. 4 and 6). The conductor 32a' is conductive to the tail electrode 25a of the circuit to be tested. The jumper conductor 52 extends from the first end portion 52a toward the test terminal portion 54 (shown in FIGS. 4 and 7). A test pad 60 is provided in the test terminal portion 54. The second end portion 52b of the jumper conductor 52 is conductive to the test pad 60 via the pad connecting portion 53. The test terminal portion 54 having the test pad 60 is arranged in the extension portion 45.

FIG. 6 shows a cross-section of the conductor connecting portion 51 connected to the jumper conductor 52. The conductor connecting portion 51 includes a conductor 51a formed of plated copper. This conductor connecting portion 51 is integrally formed with the conductor 32a' of the wiring portion 31. A through-hole 65 is formed in the base insulating layer 40. The conductor 51a fills the through-hole 65. This conductor 51a is conductive to the first end portion 52a of the jumper conductor 52. The conductor 32a' (shown in FIG. 4) of the circuit to be tested is conductive to the first end portion 52a of the jumper conductor 52 via the conductor connecting portion 51.

FIG. 7 shows a cross section of the test terminal portion 54. The test terminal portion 54 has the test pad 60 formed of plated copper. A through-hole 66 is formed in the base insulating layer 40. A part of the test pad 60 fills the through-hole 66. The test pad 60 is conductive to the second end portion 52b of the jumper conductor 52 via the pad connecting portion 53. A probe used during testing is to be in contact with a surface 60a of the test pad 60.

When the test pad 60 is formed of plated copper, a concave portion 67 is formed on the surface 60a of the test pad 60. This concave portion 67 is formed at a position corresponding to the through-hole 66 of the base insulating layer 40. It is difficult to bring the probe into contact with the concave portion 67. Therefore, the area of the surface 60a of the test pad 60 which can be in contact with the probe is reduced by the concave portion 67. In addition, in the example shown in FIG. 7, the periphery of the surface 60a of the test pad 60 is covered with a part 41a of the cover insulating layer 41. Therefore, an outer diameter D1 of the test pad 60 is set to a large size which allows the probe to be sufficiently in contact with it.

As shown in FIG. 4, the test pad 60 is arranged in a region outside the conductor bent portion C1 of the elbow portion 24 (so-called a dead space portion). In addition, the test pad 60 is fitted in the region S1 inside the line segments L2 and L3 where both side surfaces 35 and 36 of the tail pad portion 22d are extended. Therefore, the flexure 20 of the present embodiment can prevent the width of the second bent portion 22c and the width of the tail pad portion 22d from increasing while having the test pad 60.

Second Embodiment

FIG. 8 shows a cross section of the test terminal portion 54 having the test pad 60 according to the second embodiment. This example is different from the first embodiment in that the periphery of the test pad 60 is not covered with the cover insulating layer 41. The test terminal portion 54 shown in FIG. 8 can use the entire surface 60a of the test pad 60 as the contact surface with the probe.

Third Embodiment

Figure 9:
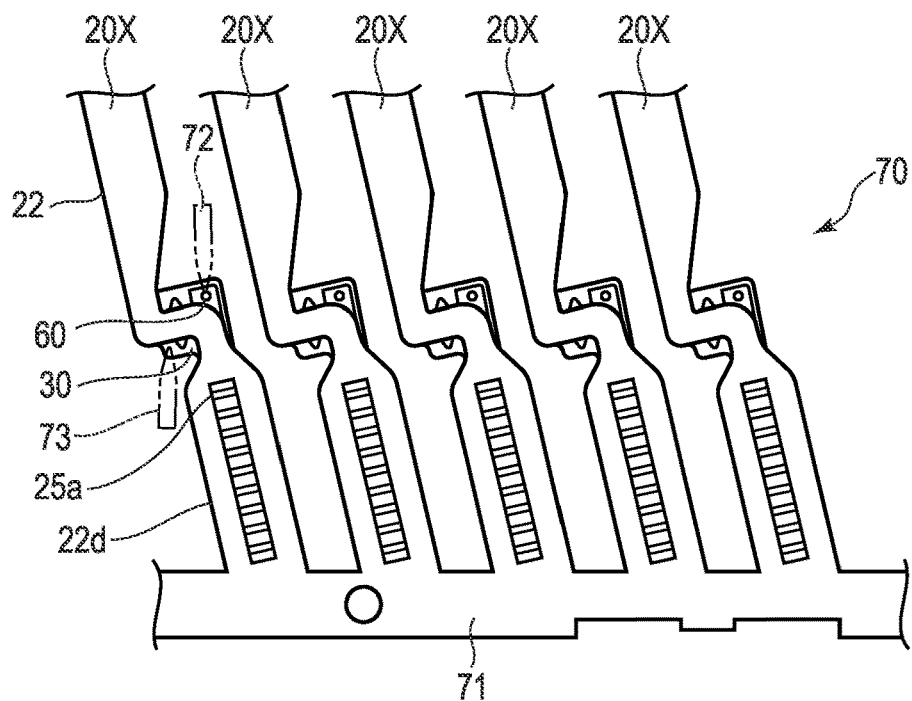
FIG. 9 is a plan view of a part of a flexure chain blank sheet according to the third embodiment.

FIG. 9 shows a part of a flexure chain blank sheet 70 according to the third embodiment. The flexure chain blank sheet 70 is an intermediate product manufactured in the process of simultaneously manufacturing a large number of flexures. The flexure chain blank sheet 70 includes a frame 71 and a plurality of flexure elements 20X (only partly shown).

The flexure elements 20X are arranged at a predetermined pitch in the frame 71. The basic configuration of the flexure element 20X is substantially common to the flexure 20 described in the first embodiment (shown in FIG. 3). The frame 71 is formed of a common stainless steel plate to the metal base 30.

The flexure element 20X is tested while being attached to the frame 71. During the testing, one probe 72 is brought into contact with the test pad 60. Another probe 73 is brought into contact with the metal base 30 as an electrical ground. Accordingly, for example, the characteristics of the circuit conductive to the tail electrode 25a can be tested.

In a cutting process after the testing, the flexure element 20X is cut off from the frame 71. As a result, the flexure 20 shown in FIG. 3 can be obtained. Note that the flexure elements 20X may be tested one by one using one pair of probes 72 and 73. Alternatively, the flexure elements 20X may be simultaneously tested using a plurality of pairs of probes.

Figure 10:
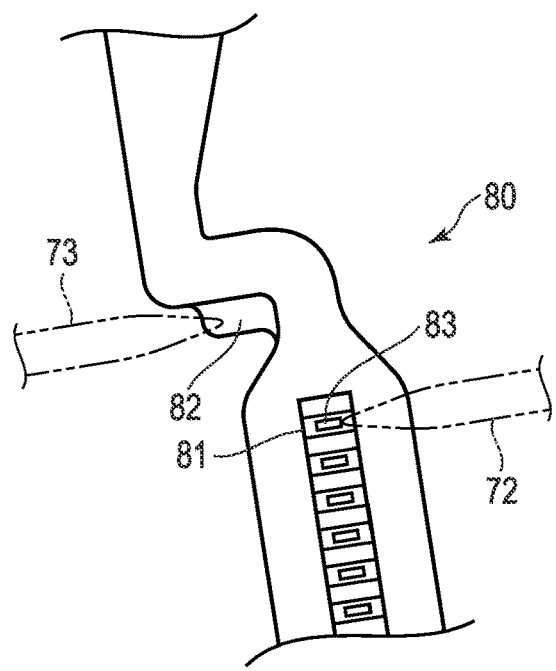
FIG. 10 is a plan view showing a tail pad portion of a conventional flexure.

FIG. 10 shows a part of a conventional flexure 80. During the testing of the conventional flexure 80, one probe 72 is brought into contact with a tail electrode 81. In addition, the other probe 73 is grounded (earthed) to a metal base 82. Therefore, in the case of the tail electrode 81 in which a hole 83 is opened, in some cases, the probe 72 cannot be reliably brought into contact with the tail electrode 81. In addition, since the tail electrode 81 is small and its shape is limited, there is a limit to reliably bringing the probe 72 into contact with it.

On the other hand, in the flexure 20 of the embodiment shown in FIGS. 3 to 8, the test pad 60 is arranged in the extension portion 45 of the flexure tail 22. The test pad 60 is provided at a position different from the tail electrode 25a. Testing is carried out using this test pad 60. Therefore, even if a hole is opened in the tail electrode 25a, the probe can be reliably brought into contact with the test pad 60. In some cases, testing can also be carried out using the tail electrode 25a.

The test pad 60 of the flexure 20 of the present embodiment is arranged in the extension portion 45 outside the conductor bent portion C1 of the flexure 22. Therefore, the flexure 20 of the present embodiment can suppress an increase in width of the second bent portion 22c of the elbow portion 24 and the tail pad portion 22d while having the test pad 60. Accordingly, the width of the flexure 20 is prevented from increasing. Therefore, in the case of, for example, the flexure chain blank sheet 70 shown in FIG. 9, the width of the flexure element 20X does not increase. Consequently, the number of flexure elements 20X which can be formed in one flexure chain blank sheet is prevented from decreasing.

Fourth Embodiment

Figure 11:
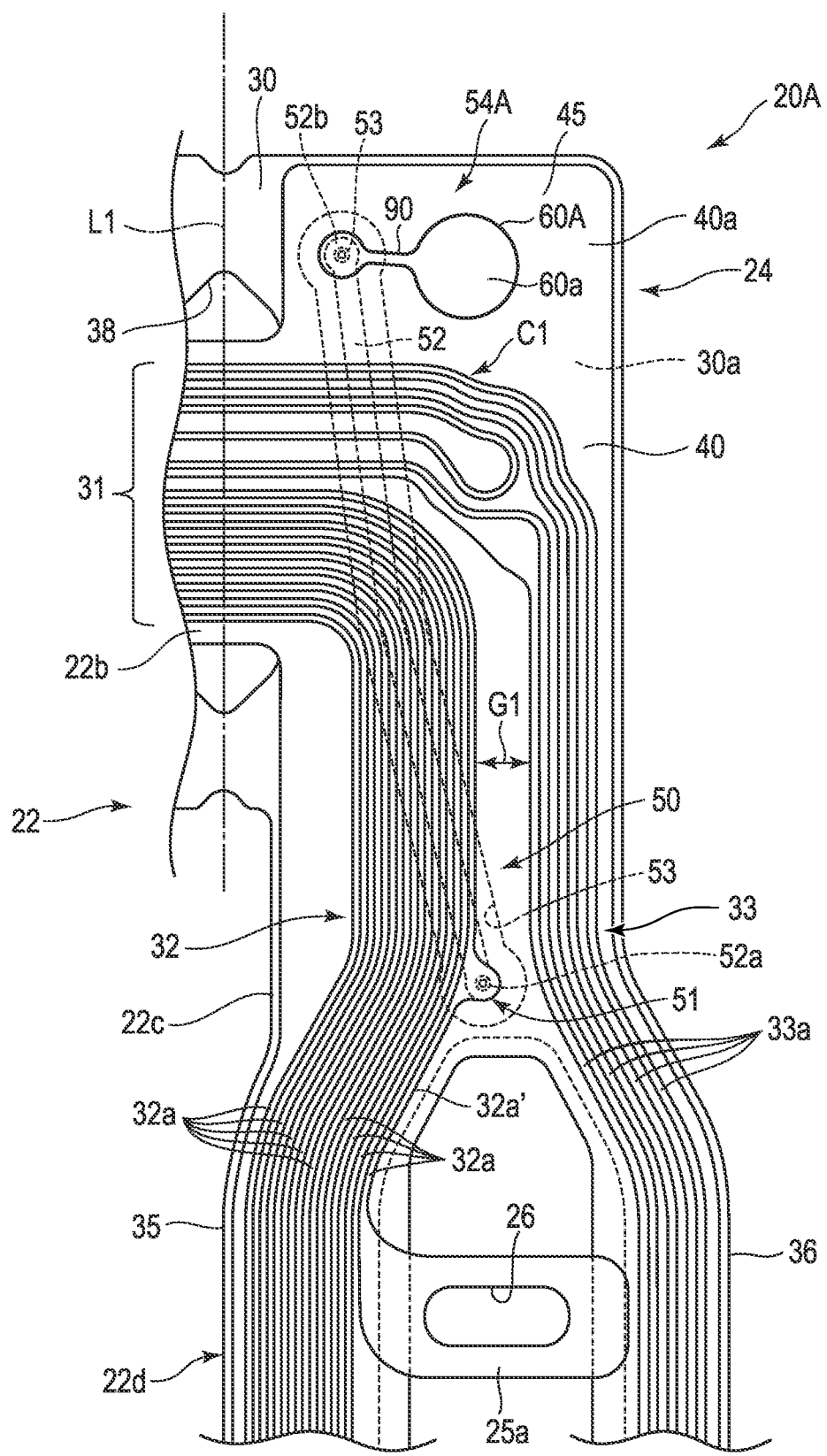
FIG. 11 is a plan view of a part of a flexure according to the fourth embodiment.
Figure 12:
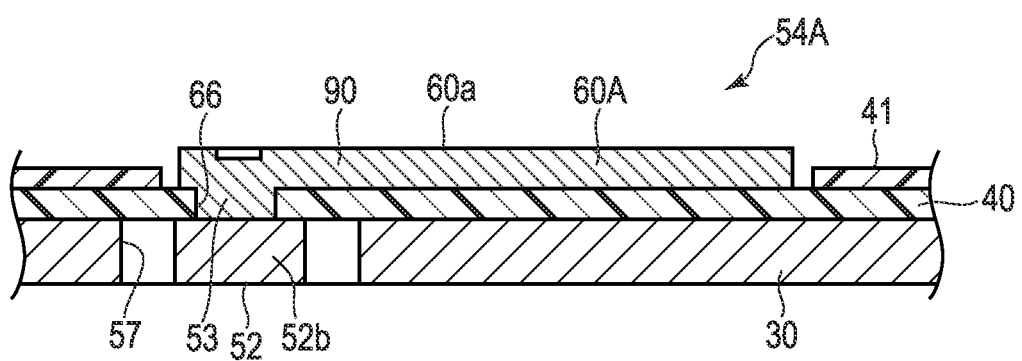
FIG. 12 is a cross-sectional view of a test terminal portion of the flexure shown in FIG. 11.

FIG. 11 shows a part of a flexure 20A according to the fourth embodiment. FIG. 12 shows a cross section of a test terminal portion 54A of the flexure 20A shown in FIG. 11. The test terminal portion 54A of the present embodiment has a test pad 60A provided at a position different from the pad connecting portion 53. The pad connecting portion 53 and the test pad 60A are conductive to each other via a connecting conductor 90. The area of the surface 60a of the test pad 60A, that is, a surface with which the measuring probe is in contact is greater than the area of the pad connecting portion 53.

The test pad 60A of the test terminal portion 54A shown in FIGS. 11 and 12 is formed at a position different from the pad connecting portion 53.

Therefore, the test pad 60A having a large surface area can be arranged in the extension portion 45 of the flexure tail 22. Since the other configuration of the flexure 20A of the present embodiment is common to the flexure 20 of the first embodiment, portions common to them are denoted by common reference symbols, and explanations of them are omitted.

Fifth Embodiment

Figure 13:
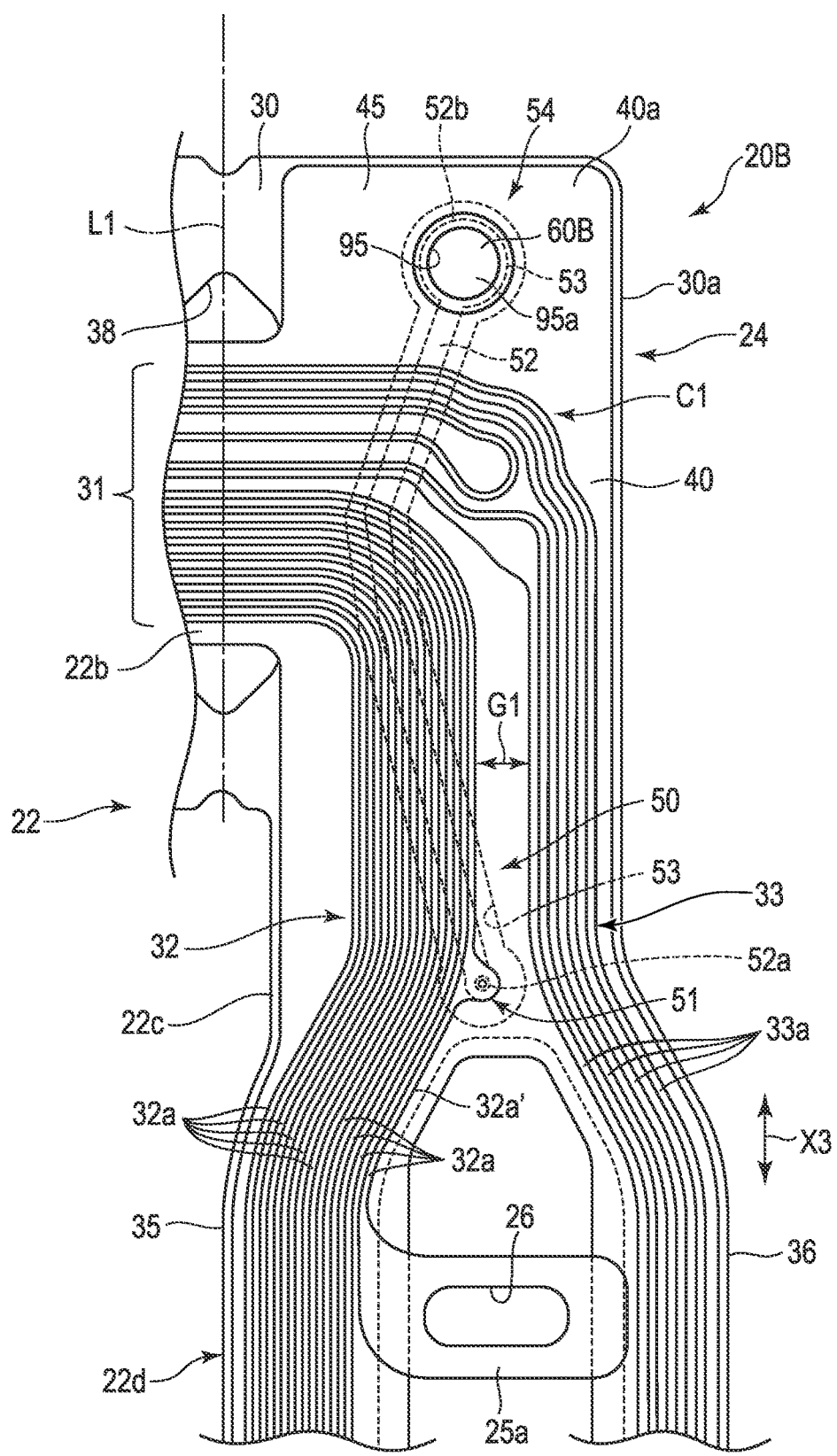
FIG. 13 is a plan view of a part of a flexure according to the fifth embodiment.
Figure 14:
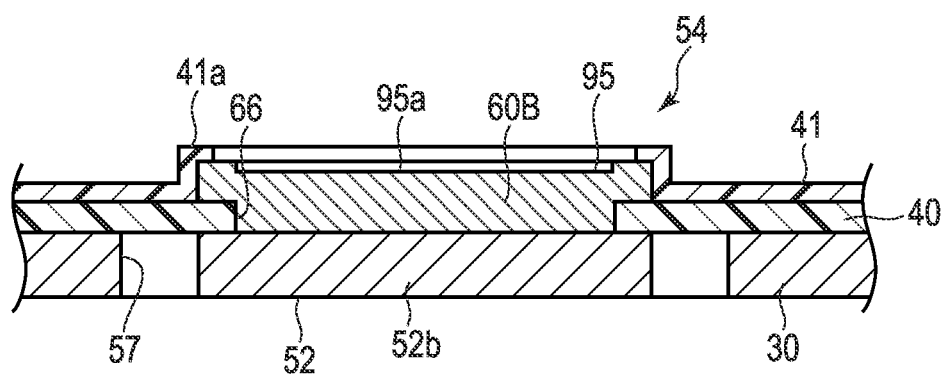
FIG. 14 is a cross-sectional view of a test terminal portion of the flexure shown in FIG. 13.

FIG. 13 shows a part of a flexure 20B according to the fifth embodiment. FIG. 14 shows a cross section of the test terminal portion 54 of the flexure 20B shown in FIG. 13. The test pad 60B of the present embodiment has a concave portion 95 having a larger diameter than the concave portion 67 of the test pad 60 of the first embodiment. The diameter of a surface 95a of the concave portion 95 is greater than the diameter of a distal end of the probe. Therefore, the probe can be in contact with the surface 95a of the concave portion 95. Since the other configuration of the flexure 20B of the present embodiment is common to the flexure 20 of the first embodiment, portions common to them are denoted by common reference symbols, and explanations of them are omitted.

Sixth Embodiment

Figure 15:
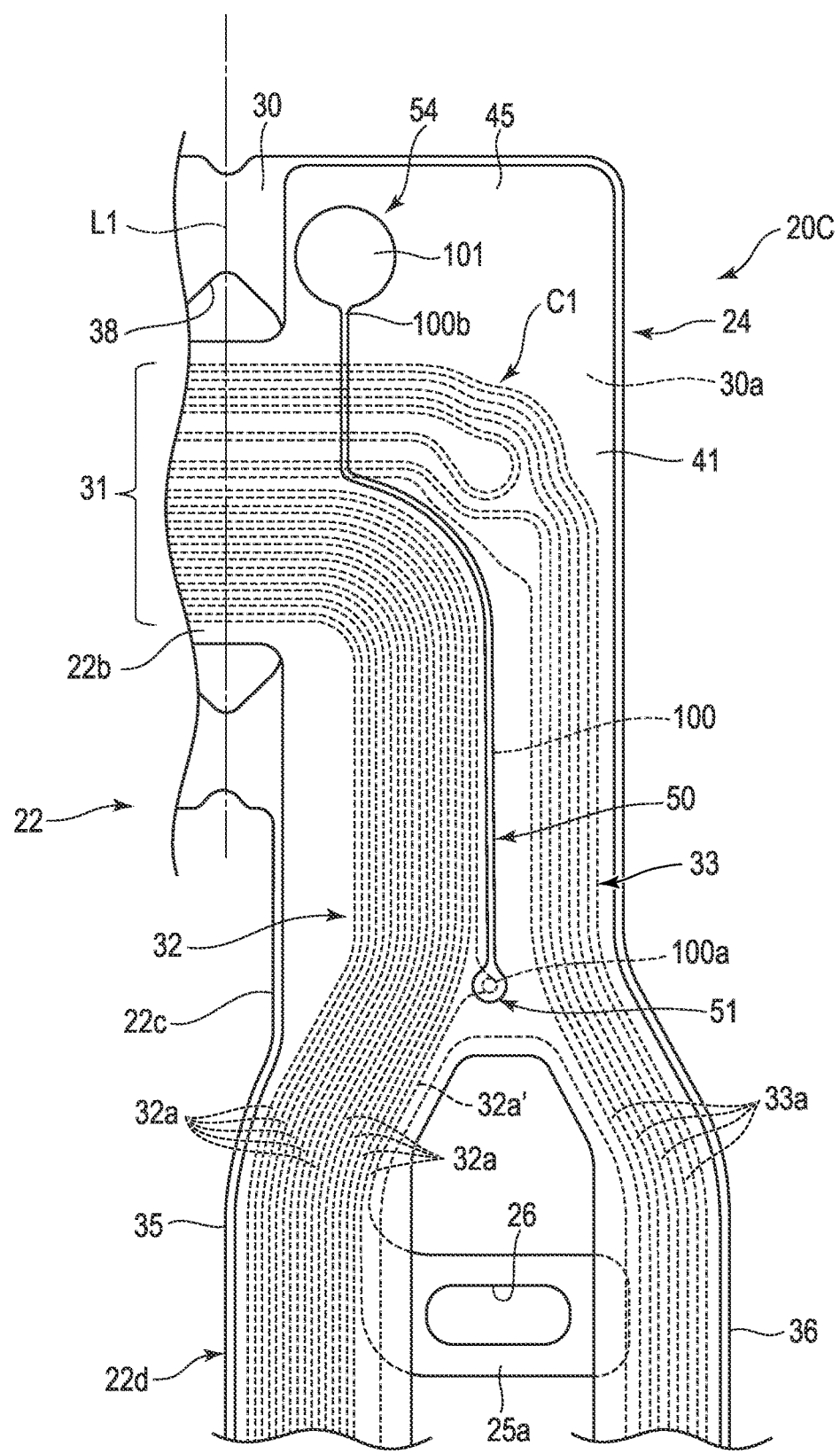
FIG. 15 is a plan view of a part of a flexure according to the sixth embodiment.

FIG. 15 shows a part of a flexure 20C having a double-layer wiring according to the sixth embodiment. FIG. 16 shows a cross section of the conductor connecting portion 51 of the flexure 20C shown in FIG. 15. FIG. 17 shows a cross section of the test terminal portion 54 of the flexure 20C. The flexure 20C of the present embodiment includes conductors 32a, 32a' and 33a, the cover insulating layer 41, a jumper conductor 100 (shown in FIG. 15), and a test pad 101. The conductors 32a, 32a' and 33a are formed on the base insulating layer 40. The cover insulating layer 41 covers the conductors 32a, 32a' and 33a. The jumper conductor 100 is formed on the cover insulating layer 41. The jumper conductor 100 and the test pad 101 are formed of plated copper. A first end portion 100a of the jumper conductor 100 is conductive to the conductor 32a' via the conductor connecting portion 51. A second end portion 100b of the jumper conductor 100 is connected to the test pad 101.

The flexure 20C of the present embodiment (FIGS. 15 to 17) has the advantage that the test pad 101 having a large surface area can be formed at any position of the extension portion 45. Since the other configuration of the flexure 20C of the present embodiment is common to the flexure 20 of the first embodiment, portions common to them are denoted by common reference symbols, and explanations of them are omitted.

Seventh Embodiment

Figure 18:
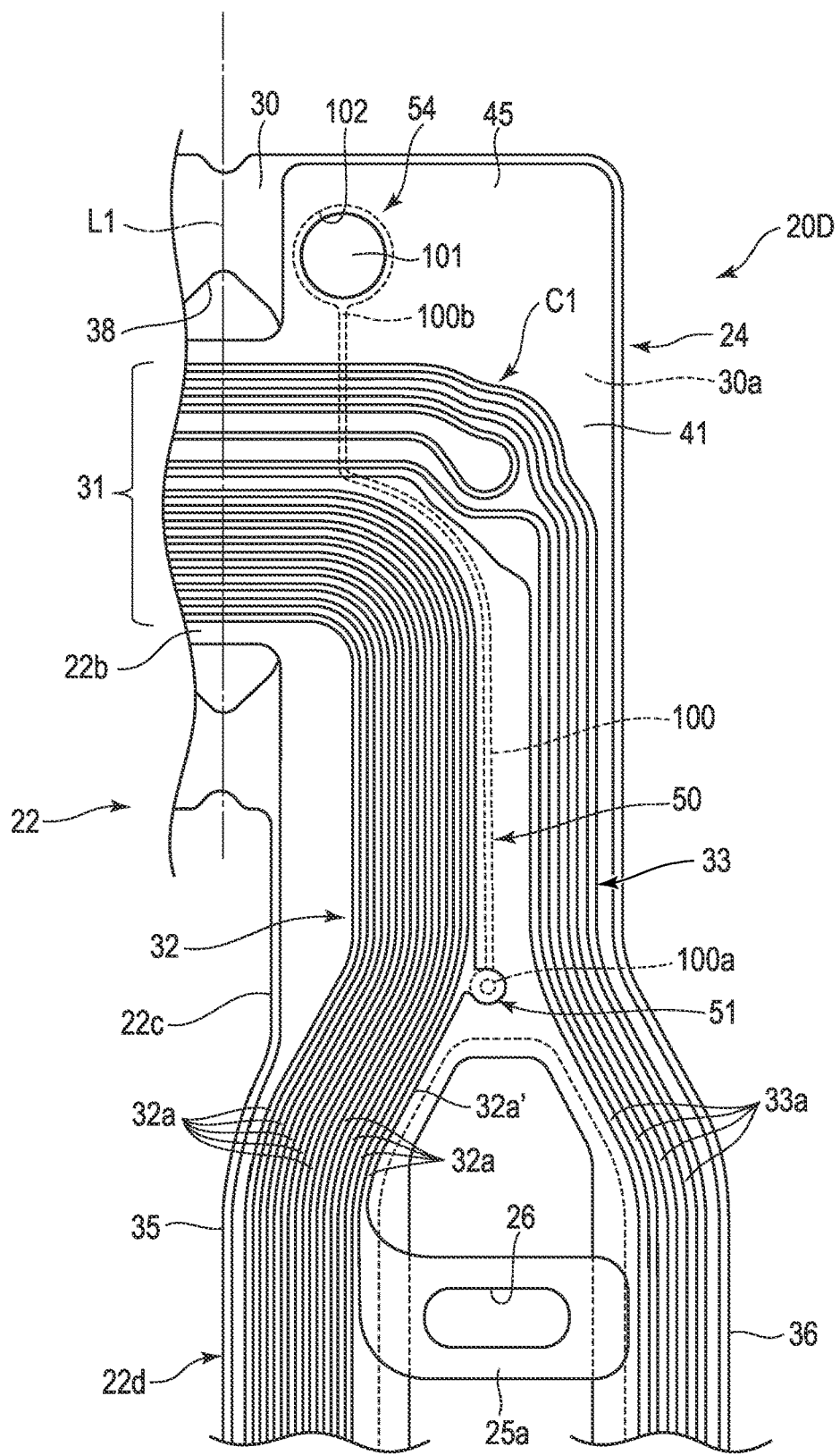
FIG. 18 is a plan view of a part of a flexure according to the seventh embodiment.

FIG. 18 shows a part of a flexure 20D having a double-layer wiring according to the seventh embodiment. FIG. 19 shows a cross section of the conductor connecting portion 51 of the flexure 20D. FIG. 20 shows a cross section of the test terminal portion 54 of the flexure 20D. The flexure 20D of the present embodiment includes the jumper conductor 100 and the test pad 101. The jumper conductor 100 is formed on the base insulating layer 40. The test pad 101 is formed on the base insulating layer 40.

The conductors 32a and 33a of the present embodiment (shown in FIG. 18) are formed on the cover insulating layer 41. The first end portion 100a of the jumper conductor 100 is conductive to the conductor 32a' in the conductor connecting portion 51. The second end portion 100b of the jumper conductor 100 (shown in FIG. 18) is conductive to the test pad 101 in the test terminal portion 54. As shown in FIG. 20, an opening 102 for exposing a surface 101a of the test pad 101 is formed in the cover insulating layer 41.

The flexure 20D of the present embodiment (FIGS. 18 to 20) also has the advantage that the test pad 101 having a large surface area can be arranged at any position of the extension portion 45. Since the other configuration of the flexure 20D of the present embodiment is common to the flexure 20 of the first embodiment, portions common to them are denoted by common reference symbols, and explanations of them are omitted.

Eighth Embodiment

Figure 21:
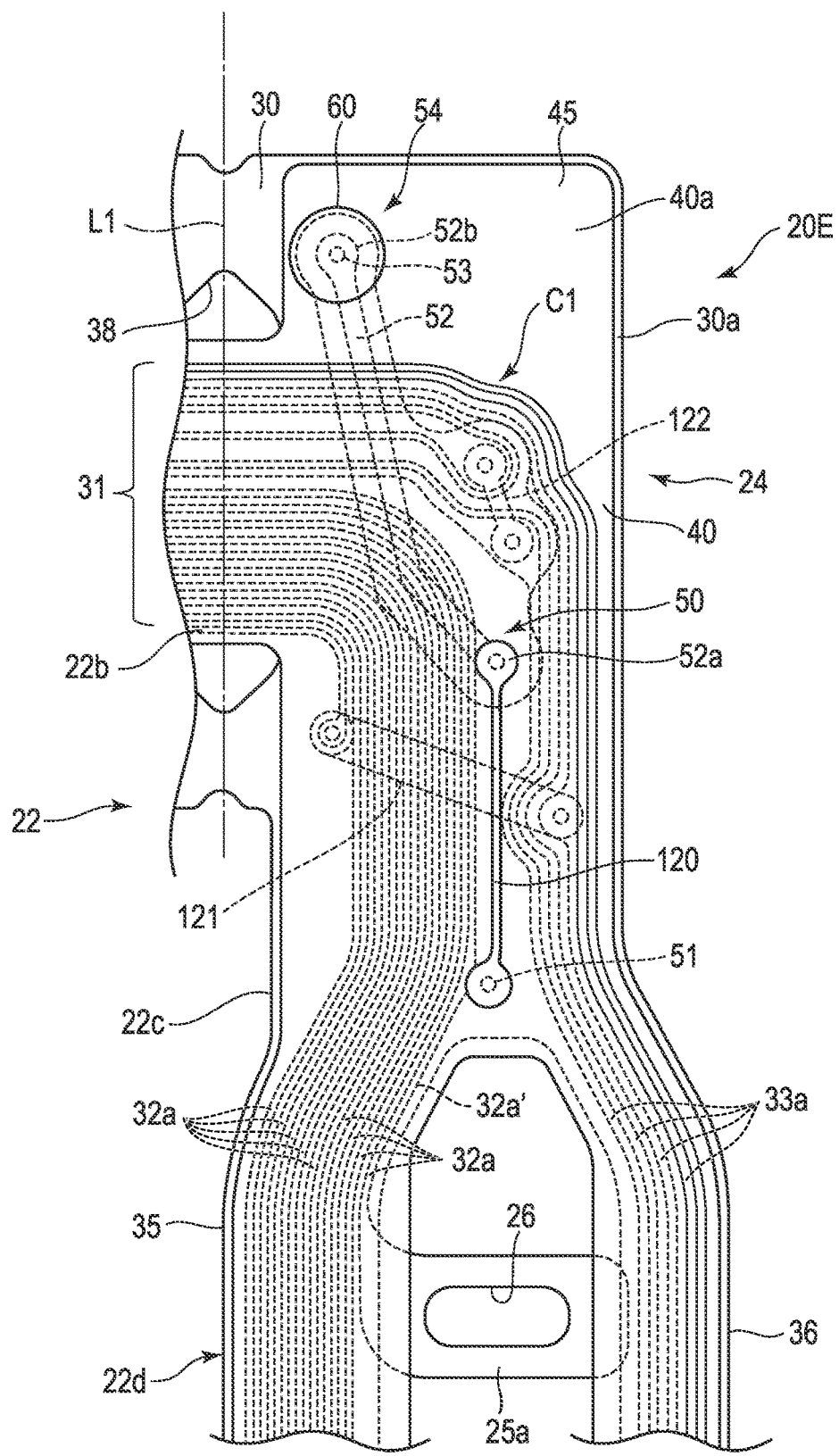
FIG. 21 is a plan view of a part of a flexure according to the eighth embodiment.

FIG. 21 shows a part of a flexure 20E according to the eighth embodiment. The test conducting portion 50 of the flexure 20E includes the jumper conductor 52 similar to that of the flexure 20 of the first embodiment (FIG. 4). The first end portion 52a of the jumper conductor 52 is connected to the conductor 32a' of the wiring portion 31 via another jumper conductor 120. In addition, according to the form of the wiring portion 31, the flexure 20E further includes other jumper conductors 121, 122, etc.

Needless to say, in carrying out the present invention, the elements constituting the flexure including the metal base, the base insulating layer and the conductors constituting the flexure can be variously modified. In addition, the conductor connecting portion, the jumper conductor, the test pad and the like constituting the test conducting portion can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure of a disk drive suspension, the flexure comprising a metal base, a base insulating layer formed on the metal base, and a conductor arranged on the base insulating layer, wherein the flexure has a flexure tail, and the flexure tail comprises:
 a tail body extending in a length direction of the flexure;
 a first bent portion extending in a width direction of the tail body from the tail body;
 a second bent portion extending in the length direction of the flexure from the first bent portion;
 a tail pad portion continuing from the second bent portion;
 a tail electrode arranged in the tail pad portion and conductive to the conductor;
 a conductor bent portion where a direction of the conductor changes along the first bent portion and the second bent portion;
 an extension portion extending in an opposite direction to the tail pad portion from the second bent portion and located outside the conductor bent portion;
 a conductor connecting portion conductive to the conductor;
 a jumper conductor having a first end portion and a second end portion, the first end portion conductive to the conductor connecting portion; and
 a test terminal portion including a test pad arranged in the extension portion and conductive to the second end portion of the jumper conductor.

2. The flexure of claim 1, wherein the jumper conductor is formed of stainless steel common to the metal base, the jumper conductor is formed in an island shape in a same plane as the metal base, and a gap for electrically insulating the jumper conductor and the metal base is formed over an entire circumference of the jumper conductor.

3. The flexure of claim 1, wherein the conductor connecting portion is arranged in a gap between a first conductor group and a second conductor group extending in a length direction of the tail pad portion.

4. The flexure of claim 1, wherein the extension portion is provided between a first line segment where one side surface of the tail pad portion is extended in a length direction of the tail pad portion and a second line segment where another side surface of the tail pad portion is extended in the length direction.

5. The flexure of claim 1, wherein the test terminal portion provided in the extension portion comprises a pad connecting portion connected to the second end portion of the jumper conductor, the test pad which is located at a position away from the pad connecting portion, and a connecting conductor connecting the pad connecting portion and the test pad.

6. The flexure of claim 1, further comprising a cover insulating layer covering the conductor, wherein the jumper conductor is formed on the cover insulating layer, and the test pad is formed on the cover insulating layer.

7. The flexure of claim 1, wherein the jumper conductor is formed on the base insulating layer, the test pad is formed on the base insulating layer, a cover insulating layer covers the jumper conductor, and the conductor formed on the cover insulating layer.

* * * * *